United States Patent [19] [11] Patent Number: 4,764,600
Bergmann et al. [45] Date of Patent: Aug. 16, 1988

[54] ISOTHIAZOLYLAZO DYES HAVING AMINOPHENYL AN AMINONAPTHYL COMPONENTS

[75] Inventors: Udo Bergmann, Darmstadt; Johannes P. Dix, Neuhofen; Guenter Hansen; Ernst Schefczik, both of Ludwigshafen; Guenther Seybold, Neuhofen, all of Fed. Rep. of Germany

[73] Assignee: BASF Aktiengesellschaft, Rheinland-Pfalz, Fed. Rep. of Germany

[21] Appl. No.: 460,793

[22] Filed: Jan. 25, 1983

[30] Foreign Application Priority Data

Feb. 16, 1982 [DE] Fed. Rep. of Germany ....... 3205435

[51] Int. Cl.$^4$ .................... C09B 29/042; C09B 29/09; D06P 1/18; D06P 3/54
[52] U.S. Cl. .................... 534/792; 534/733; 534/778; 534/793; 534/794; 534/795; 534/887
[58] Field of Search ................ 260/158; 534/792, 794, 534/795

[56] References Cited

U.S. PATENT DOCUMENTS

| | | | |
|---|---|---|---|
| 2,771,466 | 11/1956 | Towne et al. | 260/158 |
| 3,997,520 | 12/1976 | Altermatt | 260/158 |
| 4,225,490 | 9/1980 | Entschel et al. | 260/156 |
| 4,324,899 | 4/1982 | Frishberg | 260/158 X |
| 4,330,467 | 5/1982 | Fleischer et al. | 260/155 |
| 4,354,970 | 10/1982 | Fleischer et al. | 260/158 |
| 4,374,768 | 2/1983 | Fleischer et al. | 260/158 |
| 4,382,801 | 5/1983 | Loew | 260/158 X |

FOREIGN PATENT DOCUMENTS

| | | | |
|---|---|---|---|
| 1379233 | 1/1975 | United Kingdom | 260/158 |
| 2041391 | 9/1980 | United Kingdom | 260/158 |

Primary Examiner—Floyd D. Higel
Attorney, Agent, or Firm—Oblon, Fisher, Spivak, McClelland & Maier

[57] ABSTRACT

An isothiazolylazo dye of the formula I

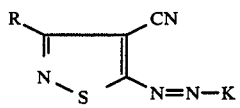

wherein R is an alkyl group or unsubstituted aryl or substituted aryl group selected from the group consisting of

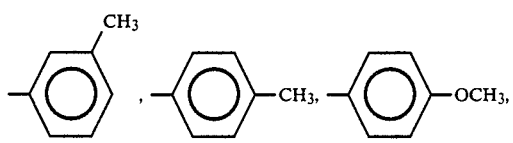

-continued

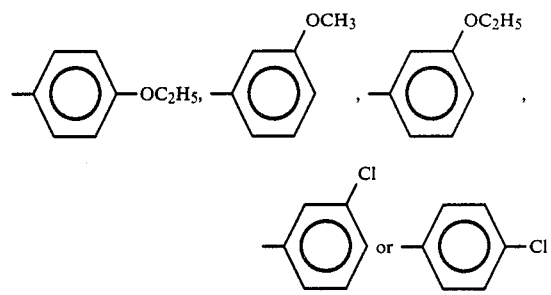

and K is a radical of the formula

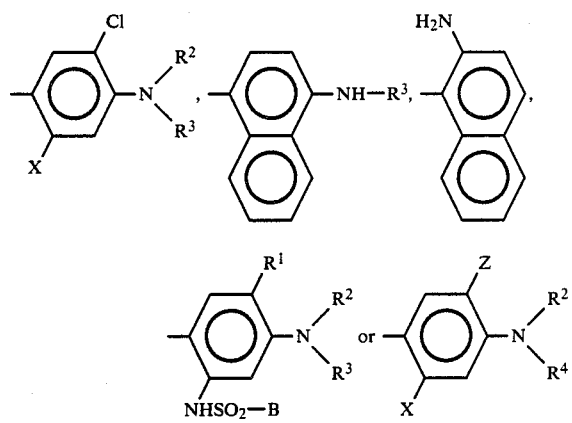

where B is $C_1$–$C_4$ alkyl or a substituted amino radical selected from the group consisting of

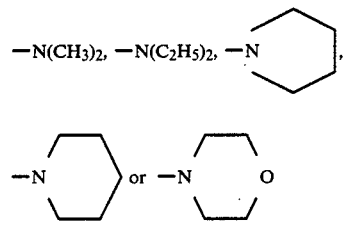

$R^1$ is hydrogen, methyl, methoxy or ethoxy, $R^2$ and $R^3$ independently of one another are each unsubstituted $C_1$–$C_4$ alkyl or substituted alkyl groups selected from the group of $C_1$–$C_4$ alkyls which are substituted by chlorine, bromine, cyano, hydroxyl, $C_1$–$C_4$-alkoxy, benzyloxy, phenoxy, phenyl, $C_1$–$C_4$-alkylcarbonyloxy which is unsubstituted or substituted by $C_1$–$C_4$-alkoxy, phenoxy or phenyl, phenycarbonyloxy which is unsubstituted or substituted by chlorine, bromine, methoxy, ethoxy, methyl or ethyl, oxycarbonyl, $C_1$–$C_4$-alkoxycarbonyl, $C_1$–$C_4$-alkoxycarbonyloxy, carbamyl, phenalkyloxycarbonyloxy, phenoxyalkyloxycarbonyloxy, $C_1$–$C_4$-alkoxyalkoxycarbonyloxy, phenylaminocarbonyloxy which is unsubstituted or substituted by chlorine, methoxy or methyl, $C_1$–$C_4$-alkoxyalkoxycarbonyl, phenylalkyloxycarbonyl or $C_1$–$C_4$-alkylaminocar- (Abstract continued on next page.)

bonyloxy which is unsubstituted or substituted by $C_1$-$C_4$-alkyl, $C_1$-$C_4$-alkoxy, chlorine or bromine; or $R^3$ is hydrogen, $R^4$ is a radical of the formula —A—OCO—Y—R, Z is hydrogen or methyl, X is hydrogen, methyl, methoxy, chlorine or an acylamino radical selected from the group consisting of

—NH—CHO, —NHCOCH$_3$, —NHCOC$_2$H$_5$,

—NH—CO—aryl, —NH—COCH$_2$—aryl,

-continued

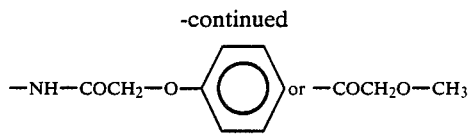

A is $C_2$- or $C_3$-alkylene and Y is —O— or —NH—. The dyes are very useful for dyeing cellulose esters and synthetic polyesters; the dyeings obtained are from yellow to blue, and very fast.

1 Claim, No Drawings

ISOTHIAZOLYLAZO DYES HAVING AMINOPHENYL AN AMINONAPTHYL COMPONENTS

The present invention relates to compounds of the general formula I

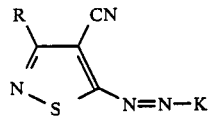

where R is alkyl or unsubstituted or substituted aryl and K is a radical of the formula

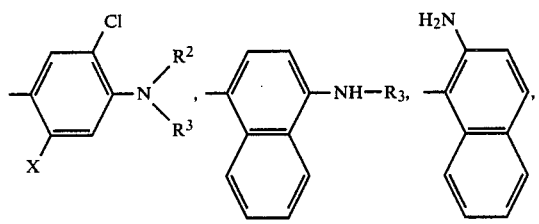

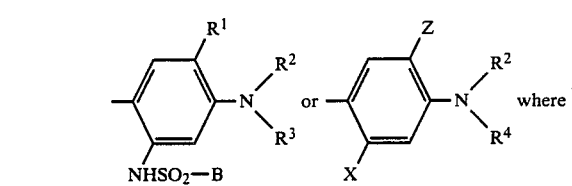

B is $C_1$-$C_4$-alkyl or substituted amino, $R^1$ is hydrogen, methyl, methoxy or ethoxy, $R^2$ and $R^3$ independently of one another are each unsubstituted or substituted alkyl, $R^3$ may furthermore be hydrogen, $R^4$ is a radical of the formula —A—OCO—Y—R, Z is hydrogen or methyl, X is hydrogen, methyl, methoxy, chlorine or acylamino, A is $C_2$- or $C_3$-alkylene and Y is —O— or —NH—.

Alkyl R is preferably of 1 to 8 carbon atoms, specific examples being methyl, ethyl, n-propyl, i-propyl, butyl, hexyl and 2-ethylhexyl. Unsubstituted or substituted aryl radicals R are, for example,

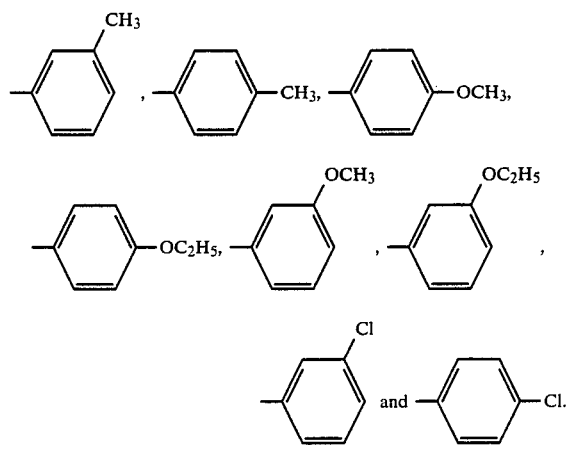

Substituted amino radicals B are, for example, $N(CH_3)_2$, $N(C_2H_5)_2$,

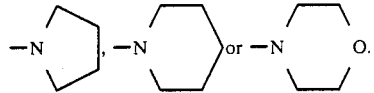

Unsubstituted or substituted alkyl radicals $R^2$ and $R^3$ are, for example, alkyl which is of 1 to 4 carbon atoms and can be substituted by chlorine, bromine, cyano, hydroxyl, $C_1$-$C_4$-alkyoxy, benzyloxy, phenoxy, phenyl, $C_1$-$C_4$-alkylcarbonyloxy which may be unsubstituted or further substituted by $C_1$-$C_4$-alkoxy, phenoxy or phenyl, phenylcarbonyloxy which is unsubstituted or substituted by Cl, Br, $OCH_3$, $OC_2H_5$, $CH_3$ or $C_2H_5$, oxycarbonyl, $C_1$-$C_4$-alkoxycarbonyl, $C_1$-$C_4$-alkoxycarbonyloxy, carbamyl, phenalkyloxycarbonyloxy, phenoxyalkyloxycarbonyloxy, $C_1$-$C_4$-alkoxyalkoxycarbonyloxy, phenylaminocarbonyloxy which is unsubstituted or substituted by Cl, methoxy or methyl, $C_1$-$C_4$-alkoxyalkoxycarbonyl, phenylalkyloxycarbonyl or $C_1$-$C_4$-alkylaminocarbonyloxy which is unsubstituted or substituted by $C_1$-$C_4$-alkyl, $C_1$-$C_4$-alkoxy, chlorine or bromine.

Specific examples of such radicals are: $CH_3$, $C_2H_5$, $C_3H_7$, $C_4H_9$, $C_2H_4Cl$, $C_2H_4CN$, $C_2H_4OH$, $CH_2$—$CHOH$—$CH_3$, $CH_2$—$CHOH$—$C_2H_5$,

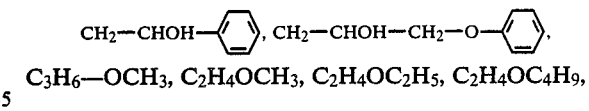

$C_3H_6$—$OCH_3$, $C_2H_4OCH_3$, $C_2H_4OC_2H_5$, $C_2H_4OC_4H_9$,

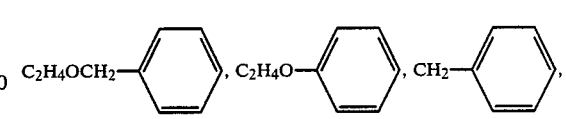

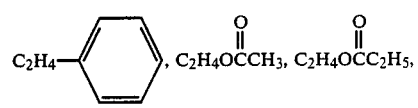

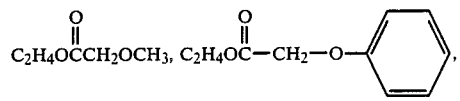

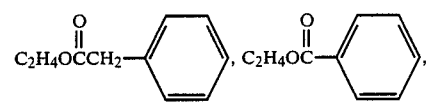

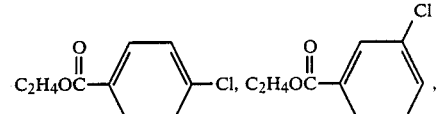

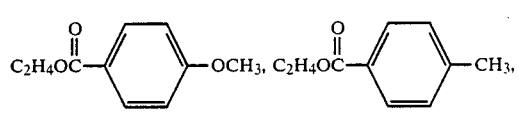

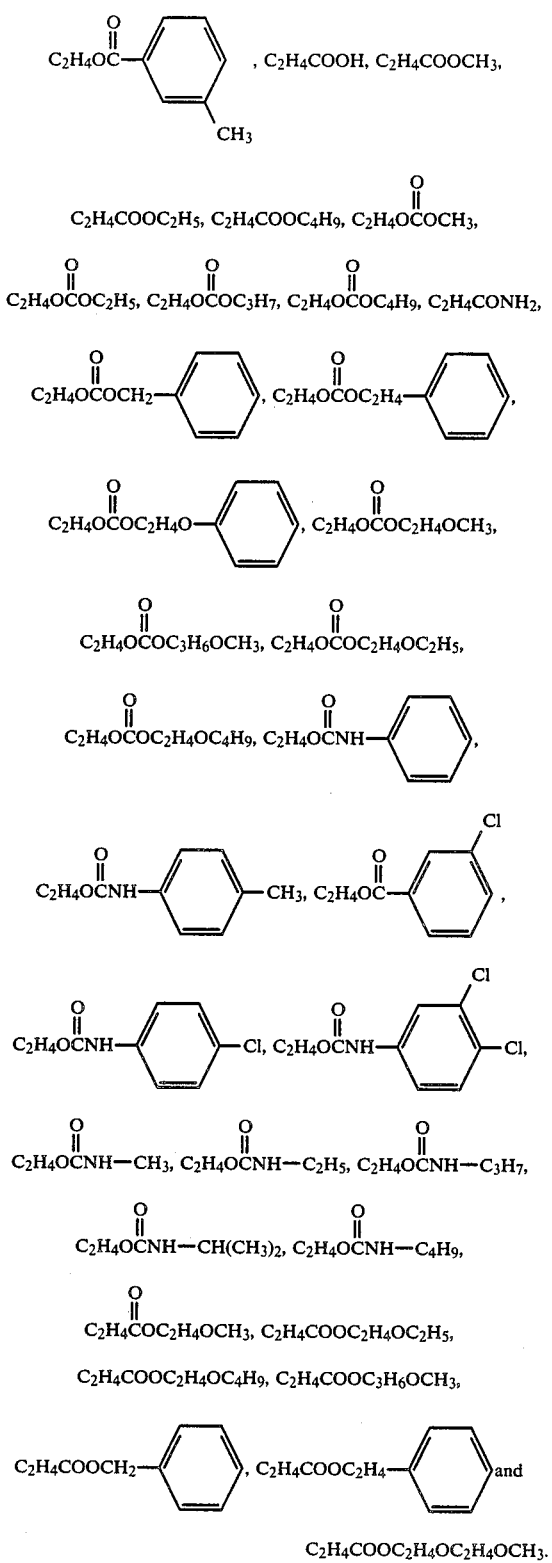

, C₂H₄COOH, C₂H₄COOCH₃,

C₂H₄COOC₂H₅, C₂H₄COOC₄H₉, C₂H₄OCOCH₃,

C₂H₄OCOC₂H₅, C₂H₄OCOC₃H₇, C₂H₄OCOC₄H₉, C₂H₄CONH₂,

C₂H₄OCOC₃H₆OCH₃, C₂H₄OCOC₂H₄OC₂H₅,

C₂H₄OCOC₂H₄OC₄H₉,

C₂H₄OCNH—CH₃, C₂H₄OCNH—C₂H₅, C₂H₄OCNH—C₃H₇,

C₂H₄OCNH—CH(CH₃)₂, C₂H₄OCNH—C₄H₉,

C₂H₄COC₂H₄OCH₃, C₂H₄COOC₂H₄OC₂H₅,

C₂H₄COOC₂H₄OC₄H₉, C₂H₄COOC₃H₆OCH₃, and

C₂H₄COOC₂H₄OC₂H₄OCH₃.

Specific examples of R⁴ are C₂H₄OCOOCH₃, C₂H₄OCOC₂H₅,

C₂H₄OCOC₃H₇, C₂H₄OCOC₄H₉, C₂H₄OCOC₂H₄OCH₃,

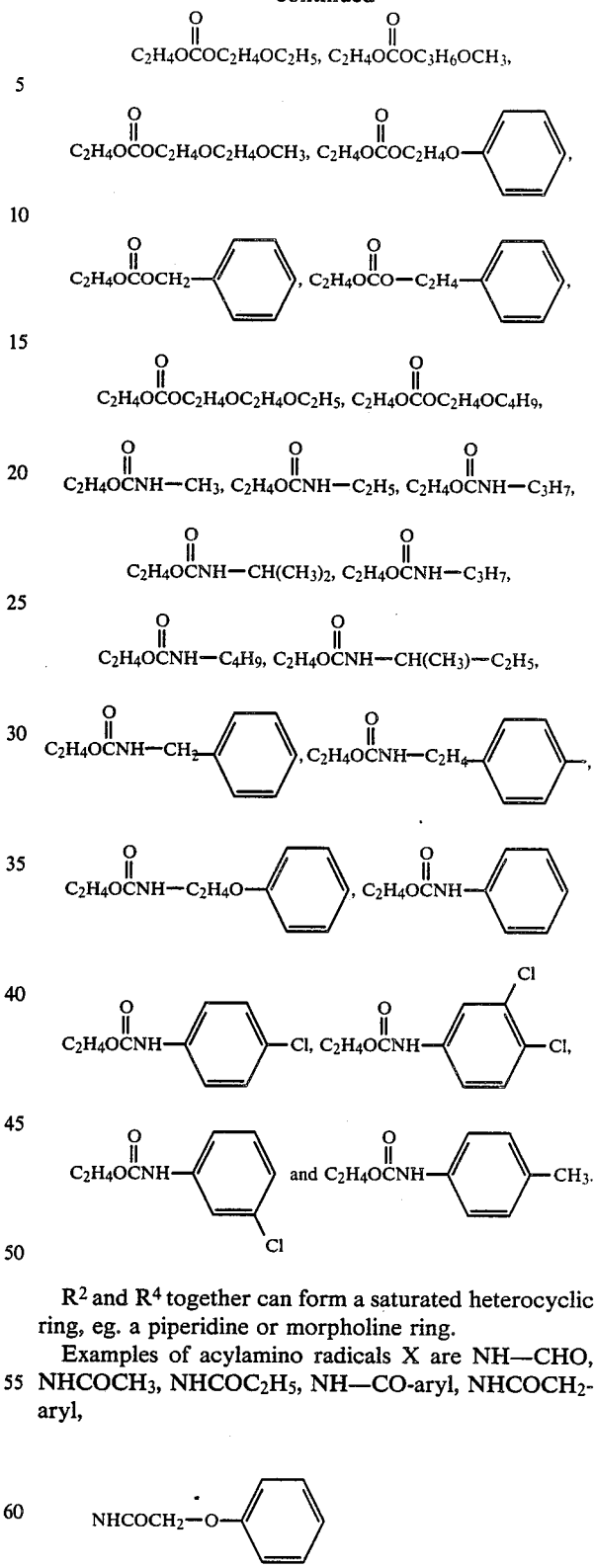

C₂H₄OCOC₂H₄OC₂H₅, C₂H₄OCOC₃H₆OCH₃,

C₂H₄OCOC₂H₄OC₂H₄OCH₃, C₂H₄OCOC₂H₄O—

C₂H₄OCOC₂H₄OC₂H₄OC₂H₅, C₂H₄OCOC₂H₄OC₄H₉,

C₂H₄OCNH—CH₃, C₂H₄OCNH—C₂H₅, C₂H₄OCNH—C₃H₇,

C₂H₄OCNH—CH(CH₃)₂, C₂H₄OCNH—C₃H₇,

C₂H₄OCNH—C₄H₉, C₂H₄OCNH—CH(CH₃)—C₂H₅,

R² and R⁴ together can form a saturated heterocyclic ring, eg. a piperidine or morpholine ring.

Examples of acylamino radicals X are NH—CHO, NHCOCH₃, NHCOC₂H₅, NH—CO-aryl, NHCOCH₂-aryl,

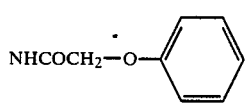

and CO—CH₂—O—CH₃.

The compounds of the formula I can be prepared by reacting a diazonium compound of an amine of the formula

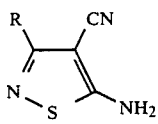

with a coupling component of the formula

H—K

In the Examples which follow, and illustrate the invention, parts and percentages are by weight, unless stated otherwise.

The compounds of the formula I are useful for dyeing cellulose esters and in particular synthetic polyesters; the dyeings obtained are from yellow to blue, and as a rule very fast. It may be advantageous to use a mixture of compounds of the formula I for this purpose.

Of particular industrial importance are compounds of the formula Ia

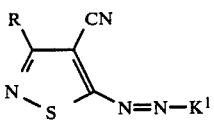 Ia where $K^1$ is a radical of the formula

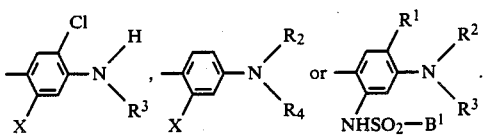

$B^1$ is $C_1$–$C_4$-alkyl, and R, $R^1$, $R^2$, $R^3$, $R^4$ and X have the above meanings.

$R^1$ is preferably H, $CH_3$ or $OCH_3$, and $R^2$ is preferably $CH_3$, $C_2H_5$, $C_3H_7$, $C_4H_9$, $C_2H_4CN$, $C_2H_4OH$, $CH_2$—$CHOHCH_3$, $CH_2CHOHC_2H_5$, $C_3H_6OCH_3$, $C_2H_4OCH_3$, $C_2H_4OC_2H_5$, $C_2H_4OC_4H_9$,

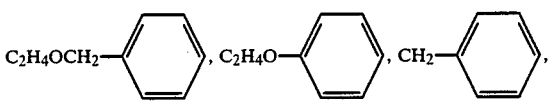

$C_2H_4$—⟨phenyl⟩, $C_2H_4COOCH_3$, $C_2H_4COOC_2H_5$,

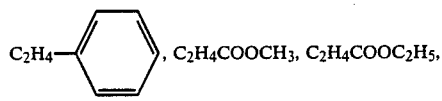

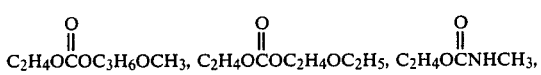

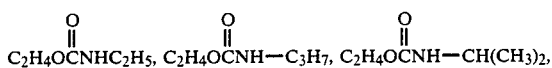

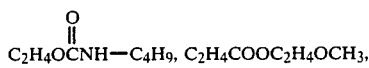

-continued $C_2H_4COOC_2H_4OC_2H_5$, $C_2H_4COOC_2H_4OC_4H_9$, $C_2H_4COOC_3H_6OCH_3$, $C_2H_4COOCH_2$—⟨phenyl⟩ or

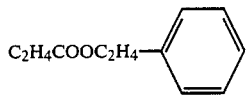

EXAMPLE 1

7 parts of 5-amino-4-cyano-3-methylisothiazole were dissolved in 75 parts by volume of a mixture of 17 parts of glacial acetic acid and 3 parts of propionic acid, 20 parts of 85% strength sulfuric acid were added, 16 parts of nitrosylsulfuric acid (11.5% of $N_2O_3$) were allowed to run in slowly into the stirred mixture at 0–5° C., and stirring was continued at this temperature for 4 hours. The diazonium salt solution thus obtained was allowed to run slowly into a mixture of 11.2 parts of N-ethyl-N-methoxycarbonyloxyethylaniline, 20 parts by volume of 32 percent strength hydrochloric acid, 250 parts of water, 250 parts of ice and one part of amidosulfonic acid. After coupling was complete, the product was filtered off under suction, washed neutral and dried under reduced pressure at 50° C. to give 16.5 parts of the dye of the formula

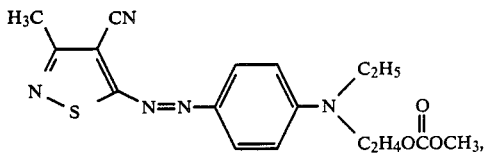

This dye dyes polyester fibers in fast, clear bluish red hues.

EXAMPLE 2

A diazo solution prepared as described in Example 1 from 7 parts of 5-amino-4-cyano-3-methylisothiazole was added to a mixture of 16 parts of N-ethyl-N,β-phenylethoxycarbonyloxyethylaniline, 30 parts by volume of 32% strength hydrochloric acid, 250 parts of water and 250 parts of ice. After coupling was complete, the product was filtered off under suction, washed neutral, and dried under reduced pressure at 50° C. to give 18.8 parts of the dye of the formula

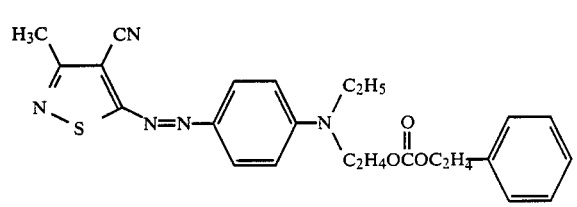

This dye dyes polyesters in bluish red hues.

EXAMPLE 3

11.1 parts of N-ethyl-N-propylaminocarbonyloxyethylaniline in 10 parts by volume of dimethylformamide and 20 parts by volume of 32% strength hydrochloric acid were added to a mixture of 250 parts of water, 250 parts of ice and one part of amidosulfonic acid. A diazonium salt solution prepared as described in Example 1 was allowed to run slowly into the above mixture. After coupling was complete, the product was filtered off under suction, washed neutral and dried under reduced pressure at 20° C. to give 17.2 parts of the dye of the formula

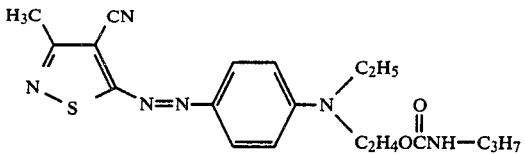

This dye dyes polyesters in clear bluish red hues.

EXAMPLE 4

14.2 parts of N-ethyl-N-phenylaminocarbonyloxyethylaniline in 8 parts by volume of dimethylformamide and 30 parts by volume of hydrochloric acid were coupled, by a procedure similar to that described in Example 3, with the diazonium salt obtained from 7 parts of 5-amino-4-cyano-3-methylisothiazole. After the product had been dried, 20.3 parts of the dye of the formula

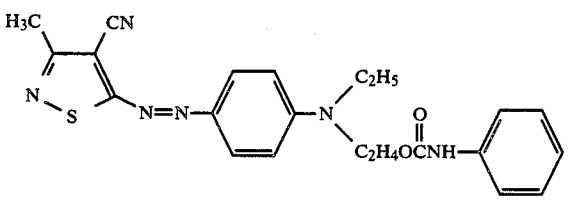

were obtained. This dye dyes polyester fibers in bluish red hues.

EXAMPLE 5

16 parts of nitrosylsulfuric acid (11.5% of $N_2O_3$) were added slowly to 10.1 parts of 5-amino-4-cyano-3-phenylisothiazole in a mixture of 75 parts by volume of glacial acetic acid/propionic acid (17:3 v/v) and 20 parts by volume of 85% strength sulfuric acid at 0°–5° C., while stirring, and stirring was continued for 4 hours at this temperature. The diazo solution thus obtained was added dropwise to a mixture of 15.7 parts of 4-chloro-3-methoxyethoxycarbonylethylaminoacetanilide, 30 parts by volume of 32% strength hydrochloric acid, 250 parts of ice, 250 parts of water and one part of amidosulfonic acid. After coupling was complete, the product was filtered off under suction, washed neutral and dried under reduced pressure at 50° C. to give 21.9 parts of the dye of the formula

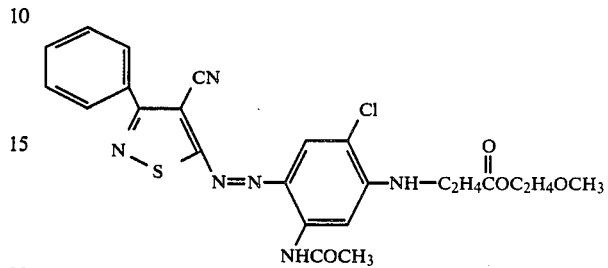

This dye dyes polyesters in fast bluish red hues.

EXAMPLE 6

A diazonium salt solution prepared as described in Example 5 from 10.1 parts of 5-amino-4-cyano-3-phenylisothiazole was added dropwise to a mixture of 16.8 parts of N-cyanoethyl-N-ethoxyethoxycarbonyloxyethylaniline, 20 parts by volume of 32% strength hydrochloric acid, 250 parts of water, 250 parts of ice and one part of amidosulfonic acid. After coupling was complete, the product was filtered off under suction, washed neutral, and dried under reduced pressure at 50° C. to give 21.3 parts of the dye of the formula

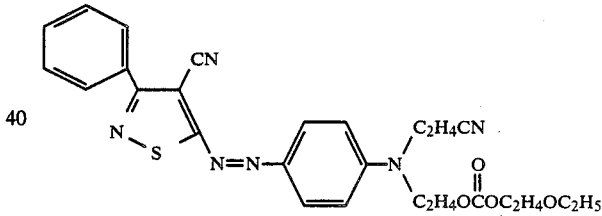

This dye dyes polyesters in fast red hues.

The compounds below were prepared by similar procedures.

| Example | R | K | Hue on polyesters |
|---|---|---|---|
| 7 | CH₃ | ![structure with Cl, NH—C₂H₄COOC₂H₄OCH₃, NHCOCH₃] | bluish red |
| 8 | CH₃ | ![structure with N(C₂H₅)C₂H₄OCOC₄H₉] | bluish red |
| 9 | CH₃ | ![structure with N(C₂H₅)C₂H₄OCNH—C₄H₉(n)] | bluish red |

-continued

| Example | R | K | Hue on polyesters |
|---|---|---|---|
| 10 | CH$_3$ | 4-CH$_3$-C$_6$H$_4$-N(C$_2$H$_4$OCH$_3$)(C$_2$H$_4$OCONH-C$_6$H$_5$) | bluish red |
| 11 | CH$_3$ | 4-CH$_3$-C$_6$H$_4$-N(C$_2$H$_4$OCNHC$_3$H$_7$)$_2$ | bluish red |
| 12 | CH$_3$ | 4-CH$_3$-3-Cl-C$_6$H$_3$-N(C$_2$H$_4$OCNHC$_3$H$_7$)$_2$ | bluish red |
| 13 | CH$_3$ | 4-CH$_3$-C$_6$H$_4$-N(C$_2$H$_4$OCNH-CH(CH$_3$)$_2$)$_2$ | bluish red |
| 14 | CH$_3$ | 4-CH$_3$-3-Cl-C$_6$H$_3$-N(C$_2$H$_4$OCNH-CH(CH$_3$)$_2$)$_2$ | bluish red |
| 15 | CH$_3$ | 4-CH$_3$-3-CH$_3$-C$_6$H$_3$-N(C$_2$H$_5$)(C$_2$H$_4$OCNH-CH(CH$_3$)$_2$) | violet |
| 16 | CH$_3$ | 4-CH$_3$-3-CH$_3$-C$_6$H$_3$-N(C$_2$H$_4$CN)(C$_2$H$_4$OCNH-C$_3$H$_7$(n)) | red |
| 17 | CH$_3$ | 4-CH$_3$-C$_6$H$_4$-N(CH$_2$-C$_6$H$_5$)(C$_2$H$_4$OCOCH$_3$) | red |
| 18 | CH$_3$ | 4-CH$_3$-C$_6$H$_4$-N(CH$_2$-C$_6$H$_5$)(C$_2$H$_4$OCNH-CH(CH$_3$)$_2$) | bluish red |
| 19 | CH$_3$ | 4-CH$_3$-C$_6$H$_4$-N(C$_2$H$_4$CN)(C$_2$H$_4$OCOC$_2$H$_4$OC$_2$H$_5$) | yellowish red |

-continued

| Example | R | K | Hue on polyesters |
|---|---|---|---|
| 20 | CH₃ | 4-methylphenyl-N(C₂H₄CN)(C₂H₄OCOC₂H₄OCH₃) | yellowish red |
| 21 | CH₃ | 4-methylphenyl-N(C₂H₄CN)(C₂H₄OC(O)NH—C₃H₇(n)) | yellowish red |
| 22 | phenyl | 4-methylphenyl-N(C₂H₄CN)(C₂H₄OCOC₂H₄OCH₃) | yellowish red |
| 23 | phenyl | 4-methylphenyl-N(C₂H₄CN)(C₂H₄OC(O)NH—C₃H₇(n)) | yellowish red |
| 24 | phenyl | 4-methylphenyl-N(CH₂-phenyl)(C₂H₄OCOCH₃) | red |
| 25 | phenyl | 4-methylphenyl-N(CH₂-phenyl)(C₂H₄OC(O)NH—CH(CH₃)₂) | bluish red |
| 26 | phenyl | 4-methylphenyl-N(C₂H₄OCNH—C₃H₇n)₂ | bluish red |
| 27 | phenyl | 4-methyl-3-chlorophenyl-N(C₂H₄OCNH—C₃H₇n)₂ | bluish red |
| 28 | phenyl | 4-methylphenyl-N(C₂H₄OC(O)NH—CH(CH₃)₂)₂ | bluish red |
| 29 | phenyl | 4-methyl-3-chlorophenyl-N(C₂H₄OC(O)NH—CH(CH₃)₂)₂ | bluish red |
| 30 | phenyl | 4-methyl-3-methylphenyl-N(C₂H₄CN)(C₂H₄OC(O)NH—C₃H₇(n)) | bluish red |

-continued

| Example | R | K | Hue on polyesters |
|---|---|---|---|
| 31 | —C6H5 | —C6H4—N(C2H5)(C2H4OCNH—C3H7(n)) with C=O | bluish red |
| 32 | —C6H5 | —C6H4—N(C2H5)(C2H4OCOCH3) with C=O | bluish red |
| 33 | —C6H5 | —C6H4—N(morpholino) | red |
| 34 | —C6H5 | —C6H3(Cl)(NHCOCH3)—NH—C2H4COOC2H4OC4H9(n) | bluish red |
| 35 | —C6H5 | —C6H3(Cl)(NHCOCH3)—NHC2H4COOC2H4OC2H4OCH3 | bluish red |
| 36 | —C6H5 | —C6H3(Cl)(NHCOCH3)—NH—C2H4COC2H4OC2H5 with C=O | bluish red |
| 37 | 3-CH3—C6H4— | —C6H4—N(C2H4CN)(C2H4OCOC2H4OC2H5) with C=O | yellowish red |
| 38 | 3-CH3—C6H4— | —C6H3(Cl)(NHCOCH3)—NH—C2H4COC2H4OC2H5 with C=O | red |
| 39 | 3-CH3—C6H4— | 3-Cl-C6H3—N(C2H4OCNH—CH(CH3)2)2 with C=O | bluish red |
| 40 | 3-CH3—C6H4— | 3-Cl-C6H3—N(C2H4OCNHC3H7n)2 with C=O | bluish red |

-continued

| Example | R | K | Hue on polyesters |
|---|---|---|---|
| 41 | 3-CH₃-C₆H₄- | 4-CH₃-3-CH₃-C₆H₃-N(C₂H₄CN)(C₂H₄OCNHC₃H₇(n))=O | red |
| 42 | 3-CH₃-C₆H₄- | 4-CH₃-C₆H₄-N(CH₂C₆H₅)(C₂H₄OCOCH₃) | red |
| 43 | 3-CH₃-C₆H₄- | 4-CH₃-3-Cl-C₆H₃-N(C₂H₄OCOCH₃)₂ | red |
| 44 | 3-CH₃-C₆H₄- | C₆H₄-N(C₂H₄CN)(C₂H₄OCNH—C₃H₇(n)) | yellowish red |
| 45 | 3-CH₃-C₆H₄- | C₆H₄-N(C₂H₄CN)(C₂H₄OCNH—C₄H₉) | yellowish red |
| 46 | 4-CH₃-C₆H₄- | 2-Cl-5-NHCOCH₃-C₆H₃-NH—C₂H₄COOC₂H₄OC₂H₅ | red |
| 47 | 4-CH₃-C₆H₄- | 3-Cl-C₆H₃-N(C₂H₄OCNH—CH(CH₃)₂)₂ | bluish red |
| 48 | 4-CH₃-C₆H₄- | 3-Cl-C₆H₃-N(C₂H₄OCNHC₃H₇n)₂ | bluish red |
| 49 | 4-CH₃-C₆H₄- | 3-CH₃-C₆H₃-N(C₂H₄CN)(C₂H₄OCNH—C₃H₇(n)) | bluish red |

-continued

| Example | R | K | Hue on polyesters |
|---|---|---|---|
| 50 | —⟨C₆H₄⟩—CH₃ (p-tolyl) | —⟨C₆H₄⟩—N(CH₂C₆H₅)(C₂H₄OCOCH₃) | red |
| 51 | —⟨C₆H₄⟩—CH₃ (p-tolyl) | —⟨C₆H₄⟩—N(CH₂C₆H₅)(C₂H₄OCONH—CH(CH₃)₂) | bluish red |
| 52 | —⟨C₆H₄⟩—CH₃ (p-tolyl) | —⟨C₆H₃(Cl)⟩—N(C₂H₄OCOCH₃)₂ | red |
| 53 | CH₃ | 4-(NH—C₂H₄OH)-naphth-1-yl | blue |
| 54 | CH₃ | 1-methyl-2-amino-naphthyl (H₂N on naphthalene) | bluish red |
| 55 | CH₃ | —⟨C₆H₃⟩— with N(C₂H₅)₂ and NHSO₂CH₃ | violet |
| 56 | CH₃ | —⟨C₆H₂(CH₃)(NHSO₂CH₃)⟩—NHC₂H₄COOCH₃ | red |
| 57 | —C₆H₅ | —⟨C₆H₂(CH₃)(NHSO₂CH₃)⟩—NHC₂H₄COOCH₃ | bluish red |

-continued

| Example | R | K | Hue on polyesters |
|---|---|---|---|
| 58 | phenyl | 4-(NHC$_2$H$_4$COOCH$_3$)-3-(NHSO$_2$CH$_3$)-phenyl | red |
| 59 | phenyl | 4-[N(C$_2$H$_5$)(C$_2$H$_4$OC(O)NH—CH(CH$_3$)$_2$)]-3-methyl-phenyl | violet |
| 60 | phenyl | 4-[N(C$_2$H$_5$)(C$_2$H$_4$OC(O)NH—C$_3$H$_7$(n))]-3-methyl-phenyl | violet |
| 61 | phenyl | 4-[N(CH$_3$)(C$_2$H$_4$OC(O)NH—phenyl)]-phenyl | violet |
| 62 | phenyl | 4-[N(CH$_2$-C$_6$H$_4$-4-Cl)(C$_2$H$_4$OC(O)CH$_3$)]-phenyl | bluish red |
| 63 | phenyl | 4-[N(CH$_2$-C$_6$H$_3$-2-Cl)(C$_2$H$_4$OC(O)NHCH(CH$_3$)$_2$)]-phenyl | bluish red |
| 64 | phenyl | 4-[N(CH$_2$-phenyl)(C$_2$H$_4$OC(O)NHC$_4$H$_9$)]-cyclohexyl | bluish red |
| 65 | phenyl | 4-[N(C$_2$H$_5$)(C$_2$H$_4$OC(O)NH-phenyl)]-phenyl | violet |
| 66 | phenyl | 4-[N(C$_2$H$_5$)(C$_2$H$_4$OC(O)C$_2$H$_4$-phenyl)]-phenyl | violet |

-continued

| Example | R | K | Hue on polyesters |
|---|---|---|---|
| 67 | CH$_3$ (3-methylphenyl) | 4-[N(C$_2$H$_5$)(C$_2$H$_4$OCONHC$_6$H$_5$)]phenyl | violet |
| 68 | CH$_3$ (3-methylphenyl) | 4-[N(CH$_3$)(C$_2$H$_4$OCONHC$_6$H$_5$)]phenyl | violet |
| 69 | CH$_3$ (3-methylphenyl) | 2-methyl-4-(NHSO$_2$CH$_3$)-5-(NH—C$_2$H$_4$COOC$_2$H$_4$OC$_2$H$_5$)phenyl | bluish red |
| 70 | CH(CH$_3$)$_2$ | 4-[N(CH$_2$-C$_6$H$_4$-4-Cl)(C$_2$H$_4$OCOCH$_3$)]phenyl | red |
| 71 | CH(CH$_3$)$_2$ | 4-[N(CH$_2$-C$_6$H$_4$-4-Cl)(C$_2$H$_4$OCONH—CH(CH$_3$)$_2$)]phenyl | red |
| 72 | CH(CH$_3$)$_2$ | 4-[N(CH$_2$-C$_6$H$_4$-2-Cl)(C$_2$H$_4$OCONH—CH(CH$_3$)$_2$)]phenyl | red |
| 73 | CH(CH$_3$)$_2$ | 4-[N(CH$_2$-C$_6$H$_4$-2-Cl)(C$_2$H$_4$OCOCH$_3$)]phenyl | red |
| 74 | CH(CH$_3$)$_2$ | 4-[N(C$_2$H$_5$)(C$_2$H$_4$OCOC$_2$H$_4$-C$_6$H$_5$)]phenyl | bluish red |

-continued

| Example | R | K | Hue on polyesters |
|---|---|---|---|
| 75 | CH(CH$_3$)$_2$ | 4-methylphenyl-N(CH$_2$C$_6$H$_5$)(C$_2$H$_4$OCOCH$_3$) | red |
| 76 | CH(CH$_3$)$_2$ | 4-methylphenyl-N(CH$_2$C$_6$H$_5$)(C$_2$H$_4$OCONH—CH(CH$_2$)$_3$) | red |
| 77 | CH(CH$_3$)$_2$ | 4-methylphenyl-N(CH$_2$C$_6$H$_5$)(C$_2$H$_4$OCNHC$_4$H$_9$) | red |
| 78 | CH(CH$_3$)$_2$ | 4-methylphenyl-N(C$_2$H$_5$)(C$_2$H$_4$OCNH-C$_6$H$_5$) | bluish red |
| 79 | CH(CH$_3$)$_2$ | 4-methylphenyl-N(CH$_3$)(C$_2$H$_4$OCNH-C$_6$H$_5$) | bluish red |
| 80 | CH(CH$_3$)$_2$ | 4-methylphenyl-N(CH$_2$—C$_6$H$_5$)(C$_2$H$_4$OCNH-C$_6$H$_5$) | red |
| 81 | CH$_3$ | 3-methyl-4-methylphenyl-N(C$_2$H$_5$)(C$_2$H$_4$OCNH-C$_6$H$_5$) | violet |
| 82 | CH$_3$ | 3-methyl-4-methylphenyl-N(C$_2$H$_5$)(C$_2$H$_4$OCNH-3-Cl-C$_6$H$_4$) | violet |
| 83 | CH$_3$ | 4-methylphenyl-N(C$_2$H$_4$-C$_6$H$_5$)(C$_2$H$_4$OCNH-C$_6$H$_5$) | bluish red |

-continued

| Example | R | K | Hue on polyesters |
|---|---|---|---|
| 84 | CH₃ | 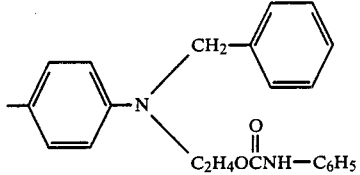 | bluish red |
| 85 | CH₃ | 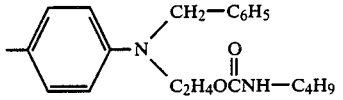 | bluish red |

We claim:
1. An isothiazolylazo dye of the formula:

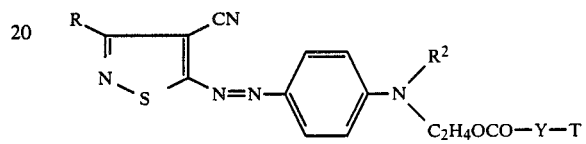

wherein R is methyl, ethyl or isopropyl, or is phenyl which is unsubstituted or substituted by methyl, methoxy or chlorine, $R^2$ is a straight-chain or branched $C_1$-$C_4$ alkyl or benzyl, X is hydrogen or methyl, Y is —O— or —NH— and T is $C_1$-$C_4$ alkyl, phenyl or chlorophenyl.

* * * * *